F. BERGIUS.
PROCESS OF HYDROGENATING CARBON COMPOUNDS UNDER HIGH PRESSURE AND ELEVATED TEMPERATURE.
APPLICATION FILED APR. 18, 1916.
1,391,664.
Patented Sept. 27, 1921.
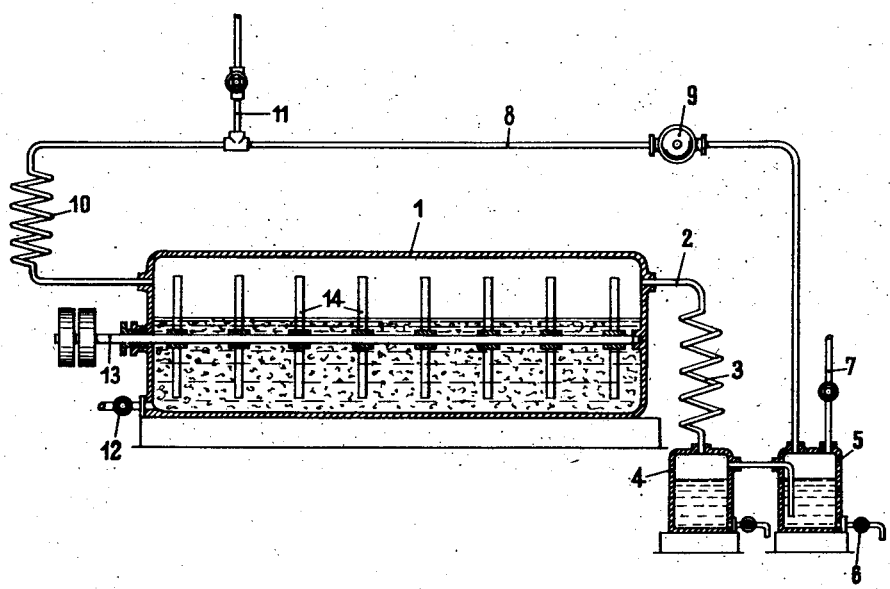

UNITED STATES PATENT OFFICE.

FRIEDRICH BERGIUS, OF ESSEN-RUHR, GERMANY, ASSIGNOR, BY MESNE ASSIGNMENTS, TO THE CHEMICAL FOUNDATION, INC., A CORPORATION OF DELAWARE.

PROCESS OF HYDROGENATING CARBON COMPOUNDS UNDER HIGH PRESSURE AND ELEVATED TEMPERATURE.

1,391,664.      Specification of Letters Patent.    Patented Sept. 27, 1921.

Application filed April 18, 1916. Serial No. 92,065.

*To all whom it may concern:*

Be it known that I, Dr. FRIEDRICH BERGIUS, a citizen of the Empire of Germany, residing at Essen-Ruhr, Germany, have invented certain new and useful Improvements in Processes of Hydrogenating Carbon Compounds Under High Pressure and Elevated Temperature, (for which I have filed applications in Germany on Dec. 24, 1914, and July 17, 1915,) of which the following is a specification.

This invention is an improvement in the process of hydrogenating, under high pressure and at an elevated temperature, natural coal or other products of carbonization of wood and other vegetable matter, pitch, tar, wood, peat and other vegetable materials which are carbonized by the heat of the process. By such process, these carbonaceous materials are transformed into liquids or soluble solids, or materials of lower boiling-point than the boiling point of the raw materials.

In order to secure these effects according to the invention care is taken to continuously circulate the atmosphere in contact with the carbon compound to be reacted on. Such circulation whereby a part of the gaseous atmosphere in contact with the raw material is continuously drawn out of the reaction space and again returned offers an opportunity to effect the heat exchange which is necessary to secure the reaction temperature within the reaction vessel, and it affords at the same time an opportunity to separate the reaction products from the reaction gas.

The possibility of an efficient temperature control in the above said manner by circulating the gas which is in contact with the raw material broadly depends on the fact that the gas is under very high pressure of say 100 atmospheres and that therefore a comparatively small quantity or volume of the gas is adapted to carry considerable quantities of heat. In order to secure the effect aimed at it is necessary to circulate a quantity of gas which is considerably in excess of the quantity of hydrogen which is consumed by the reaction process.

In order to facilitate the understanding of this invention I have shown in the annexed drawing in a diagrammatic manner a suitable device for effectively carrying out my improved process.

1 designates the reaction vessel adapted to resist high tension. 2 is a tube section forming the exit for the gaseous contents of the reaction vessel. 3 is a condensing coil, 4 is a collecting vessel for condensed products, 5 is an absorber for ammonia with outlet 6 and inlet 7 for the absorbing medium, 8 is a section of the circulating conduit, 9 is a circulating device, 10 is a heating coil, the exit end of which leads into the reaction vessel, 11 is a feeding tube for introducing fresh reaction gas, 12 is a feeding tube for raw material to be reacted on, 13 is a rotatable shaft carrying stirring members 14.

The operation of the device is as follows.

The reaction vessel 1 is filled up to a suitable height with one of the above mentioned raw materials or with a mixture of suitable raw materials. As hydrogenating gas either hydrogen or gaseous mixtures containing hydrogen may be used. The hydrogen or hydrogen containing gas mixtures may also be formed within the receptacle from substances adapted to give off hydrogen under the working conditions.

The raw material is preferably introduced into the reaction vessel at a temperature substantially equal to the reaction temperature say 400° C. The reaction gas if suitably heated within the heating coil 10 preferably also up to the reaction temperature of say about 400° C. reacts within the reaction vessel 1 on the raw material contained therein and is brought in such vessel into intimate contact with the material by continuous stirring of the raw material through stirring device 13, 14. The circulating device 9 continuously draws gas from the reaction vessel through the circulating conduit 2, 3, 4, 5, 8 and 10 and secures continuous control of the reaction temperature within the reaction vessel 1. That part of the gas transported through the circulating conduit which is formed by condensable reaction product is condensed within the condensing coil 3 and enters the collecting vessel 4 from which it may be drawn off at intervals through a cock on the vessel. The liquid drawn off from vessel 4 contains more or less of the gas present within the reaction vessel, namely hydrogen and methane and eventually, as the case may be, other gases. The comparatively small amount of methane, which is formed in the process, may in this way be removed so as to avoid its accumulation; the possibility thereof depending on the fact that methane is more soluble within liquid hydrocarbons such as are formed in this process than hydrogen. The accumulation of methane may also be avoided in any other suitable manner, for instance by drawing off either continuously or periodically more or less of the gas contained within the system and by substituting therefor fresh pure hydrogen.

Nitrogen compounds which may be contained within the raw material to be treated are under the reaction conditions in most cases transformed into ammonia which is absorbed within the absorber 5 by a suitable absorbing medium, such as sulfuric acid. It may also be condensed to liquid ammonia by cooling the gas to a temperature which is far below the condensation temperature of the hydrocarbons formed by the process and obtained within the vessel 4.

In order to be sure that the whole of the nitrogen compounds contained in the raw material is transformed into volatile ammonia, basic substances, such as lime, may be added in small quantity to the raw material. These basic substances neutralize the compounds of acid character contained within the reaction material or formed during the operation.

Fresh hydrogen may be introduced through pipe 11. The drawing shows a suitable device for carrying through the process only in a diagrammatic manner. Of course in practice the heat which is set free in the condensing coil 3 may be used directly or indirectly for reheating the gas within the heating coil 10.

What I claim is:—

1. In a process of hydrogenating carbon compounds under high pressure and at elevated temperature bringing together suitable carbon compounds with a hydrogen containing atmosphere under suitable reaction pressure and temperature within a high pressure vessel partly filled with the material to be treated, circulating the gaseous contents of the space above the material under treatment, the quantity of circulated gas being in excess of the consumed reaction gas and subjecting the circulated gas within the circulating conduit to heat exchange so as to control the temperature conditions within the reaction vessel.

2. In a process of hydrogenating carbon compounds under high pressure and at elevated temperature bringing together suitable carbon compounds with a hydrogen containing atmosphere under suitable reaction pressure and temperature within a high pressure vessel partly filled with the material to be treated, circulating the gaseous contents of the space above the material under treatment, the quantity of circulated gas being in excess of the consumed reaction gas condensing the reaction product within the circulation system, and reheating the gas cooled down by the condensation process before reintroducing it into the reaction vessel.

3. In a process of hydrogenating carbon compounds under high pressure and at elevated temperature bringing together suitable carbon compounds with a hydrogen containing atmosphere under suitable reaction pressure and temperature within a high pressure vessel partly filled with the material to be treated, circulating the gaseous contents of the space above the material under treatment, the quantity of circulated gas being in excess of the consumed reaction gas condensing the reaction product within the circulation system, and carrying over the heat given off from the gas during the condensation step to a section of the circulation conduit between the condensation section and the return point of the conduit for reheating the circulated gas.

4. A process of hydrogenating carbon compounds consisting therein that carbon compounds containing nitrogen compounds are subjected to the action of hydrogen under high pressure at elevated temperature in the presence of basic material such as lime.

5. A process of hydrogenating solid carbon compounds which consists in heating in a retort such compounds in the presence of a hydrogen atmosphere and under high reaction pressure to a high reaction temperature, continuously abstracting a mixture of reaction products and reaction gas, condensing the reaction products, reheating the abstracted reaction gas and returning it to the retort.

6. A process of hydrogenating solid carbon compounds which consists in heating in a retort such compounds to a high temperature, continuously introducing hydrogen under reaction temperature and pressure, continuously abstracting a mixture of reaction products and free hydrogen, condensing the reaction products, reheating the abstracted hydrogen and returning it to the retort.

7. A process of hydrogenating solid carbon compounds which consists in heating in a retort such compounds under reaction pressure to a high reaction temperature, continuously introducing a gaseous mixture containing hydrogen, continuously stirring the carbon compound, continuously abstracting a mixture of reaction products and reaction gas, condensing the reaction products, reheating the abstracted reaction gas and returning it to the retort.

8. In a process of hydrogenating carbon compounds containing nitrogen compounds under high pressure and at elevated temperature, bringing together suitable carbon compounds with a hydrogen containing atmosphere under suitable reaction pressure and temperature in the presence of basic material such as lime within a high pressure vessel partly filled with the material to be treated, circulating the gaseous contents of the space above the material under treatment, the quantity of circulated gas being in excess of the consumed reaction gas and subjecting the circulated gas within the circulating conduit to the heat exchange so as to control the temperature conditions within the reaction vessel.

9. In a process of hydrogenating carbon compounds containing nitrogen compounds under high pressure and at elevated temperature, bringing together suitable carbon compounds with a hydrogen containing atmosphere under suitable reaction pressure and temperature in the presence of basic material such as lime within a high pressure vessel partly filled with the material to be treated, circulating the gaseous contents of the space above the material under treatment, the quantity of circulating gas being in excess of the consumed reaction gas, condensing the reaction product within the circulation system, and reheating the gas cooled down by the condensation process before reintroducing it into the reaction vessel.

In testimony whereof I affix my signature in presence of two witnesses.

Dr. FRIEDRICH BERGIUS.

Witnesses:
 Henry Hasper,
 Arthur Schroeder.